(12) United States Patent
Jeon

(10) Patent No.: US 11,468,270 B2
(45) Date of Patent: Oct. 11, 2022

(54) ELECTRONIC DEVICE AND FEEDBACK INFORMATION ACQUISITION METHOD THEREFOR

(71) Applicant: SAMSUNG ELECTRONICS CO., LTD., Suwon-si (KR)

(72) Inventor: Silas Jeon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 354 days.

(21) Appl. No.: 16/648,456

(22) PCT Filed: Sep. 11, 2018

(86) PCT No.: PCT/KR2018/010586
§ 371 (c)(1),
(2) Date: Mar. 18, 2020

(87) PCT Pub. No.: WO2019/054715
PCT Pub. Date: Mar. 21, 2019

(65) Prior Publication Data
US 2020/0234085 A1    Jul. 23, 2020

(30) Foreign Application Priority Data
Sep. 18, 2017  (KR) .................. 10-2017-0119660

(51) Int. Cl.
*G06K 9/62*     (2022.01)
*G06N 20/00*    (2019.01)
*G06N 3/08*     (2006.01)
(52) U.S. Cl.
CPC ......... *G06K 9/6263* (2013.01); *G06K 9/6289* (2013.01); *G06N 3/08* (2013.01); *G06N 20/00* (2019.01)

(58) Field of Classification Search
CPC ...... G06K 9/6263; G06K 9/6289; G06N 3/08; G06N 20/00; G06N 3/0445; G06N 5/04
See application file for complete search history.

(56) References Cited

U.S. PATENT DOCUMENTS

2005/0054381 A1    3/2005  Lee et al.
2010/0179812 A1    7/2010  Jang et al.
(Continued)

FOREIGN PATENT DOCUMENTS

JP       2016-192020 A    11/2016
KR    10-2010-0083572 A    7/2010
(Continued)

OTHER PUBLICATIONS

International Search Report (PCT/ISA/210) dated Dec. 17, 2018 issued by the International Searching Authority in International Application No. PCT/KR2018/010586.
(Continued)

*Primary Examiner* — Christopher M Brandt
(74) *Attorney, Agent, or Firm* — Sughrue Mion, PLLC

(57) ABSTRACT

Various embodiments of the present disclosure relate to an electronic device and a feedback information acquisition method therefor. The feedback information acquisition method of the electronic device includes: acquiring input feedback information of a user and first response information of the user, which are related to a specific function; training a feedback estimation model by using the input feedback information and the first response information; acquiring second response information of the user related to the specific function; and acquiring feedback information related to the specific function by applying the second response information to the trained feedback estimation model.

15 Claims, 13 Drawing Sheets

(56) References Cited

U.S. PATENT DOCUMENTS

| | | |
|---|---|---|
| 2010/0235451 A1 | 9/2010 | Yu et al. |
| 2014/0278413 A1 | 9/2014 | Pitschel et al. |
| 2015/0020086 A1 | 1/2015 | Chen et al. |
| 2017/0154258 A1* | 6/2017 | Liu ..................... G06N 3/0454 |

FOREIGN PATENT DOCUMENTS

| | | |
|---|---|---|
| KR | 10-2013-0082701 A | 7/2013 |
| KR | 10-2015-0007936 A | 1/2015 |

OTHER PUBLICATIONS

Written Opinion (PCT/ISA/237) dated Dec. 17, 2018 issued by the International Searching Authority in International Application No. PCT/KR2018/010586.

Communication dated Jun. 2, 2022 issued by the Korean Intellectual Property Office in counterpart Korean Application No. 10-2017-0119660.

Yang Hyun Seung et al., "Emotional Interface Technologies for Service Robot", Journal of Robotics Association, vol. 1, Sep. 2006, 8 pages total.

\* cited by examiner

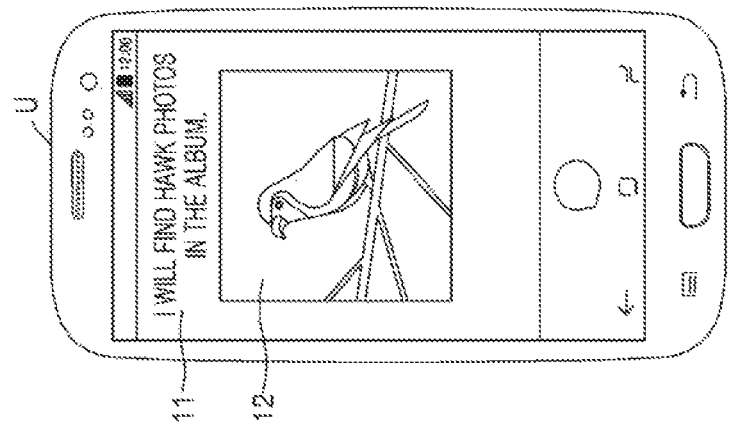
FIG. 5C
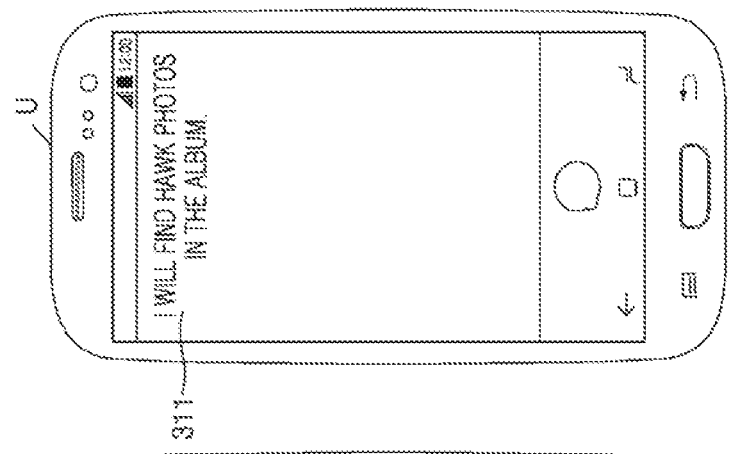
FIG. 5B
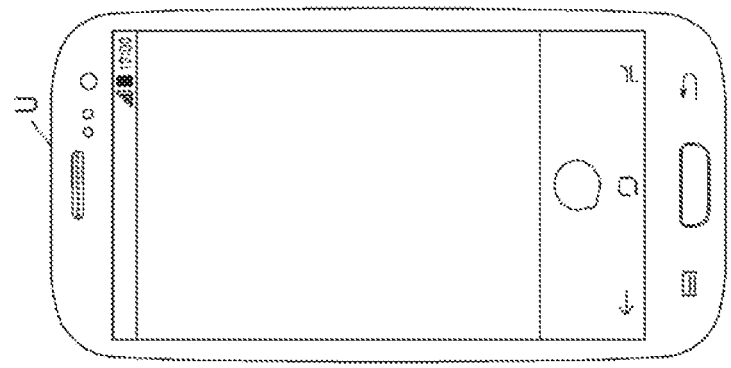
FIG. 5A

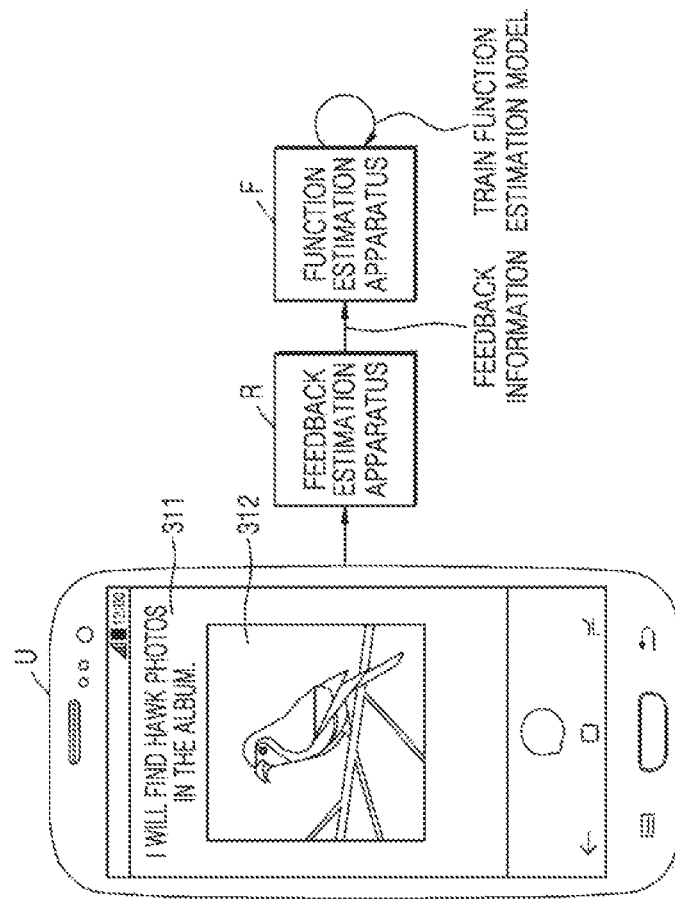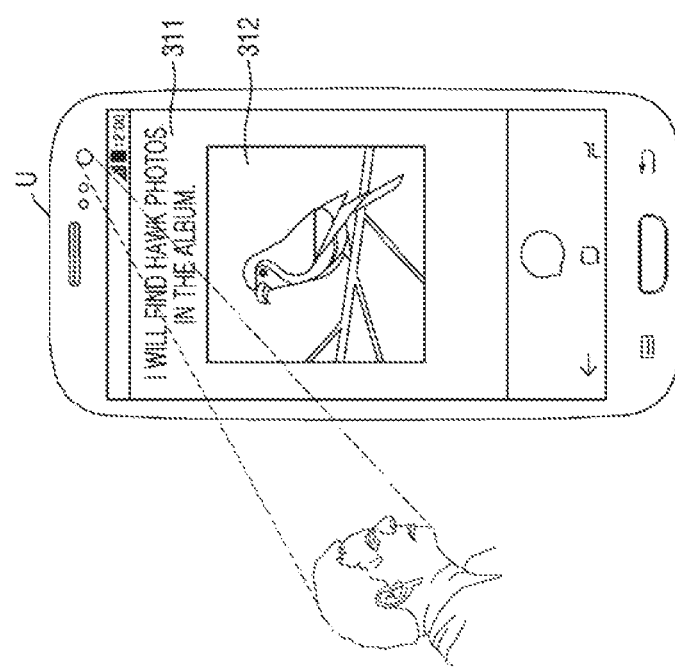
FIG. 6A
FIG. 6B

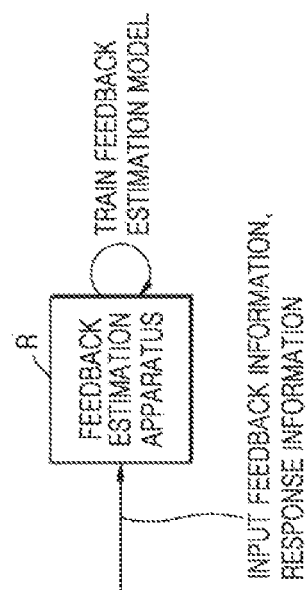
FIG. 7B
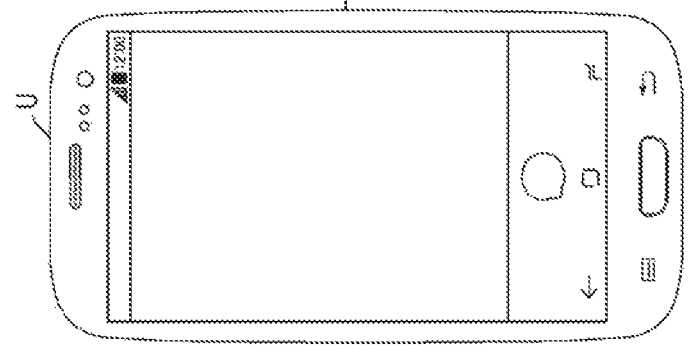
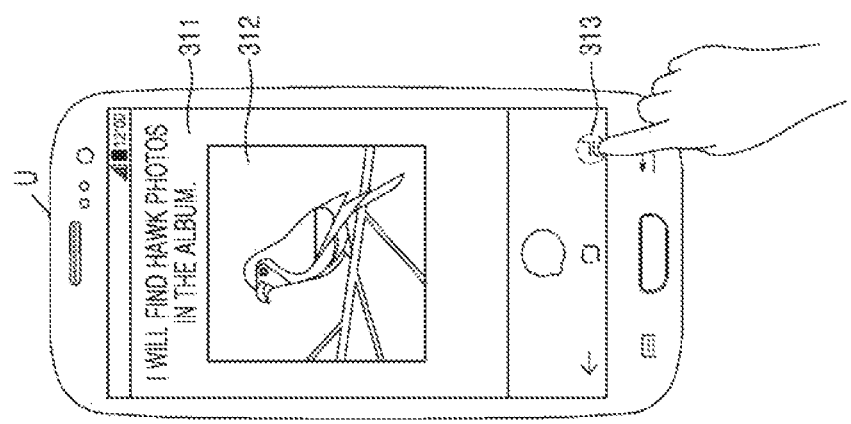
FIG. 7A

FIG. 13
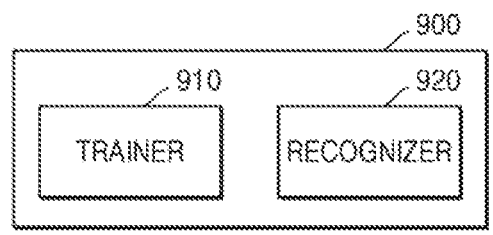
FIG. 14A                FIG. 14B
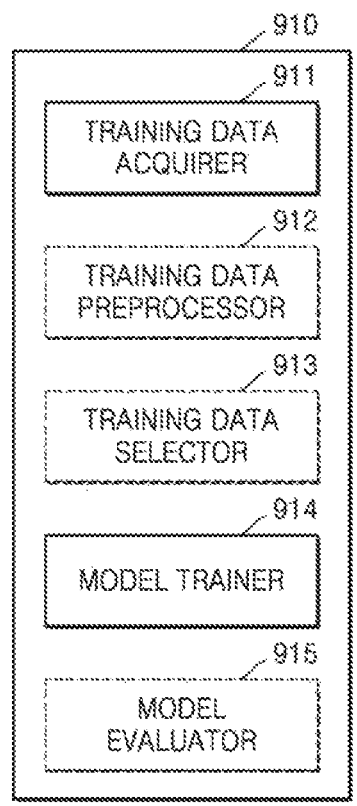 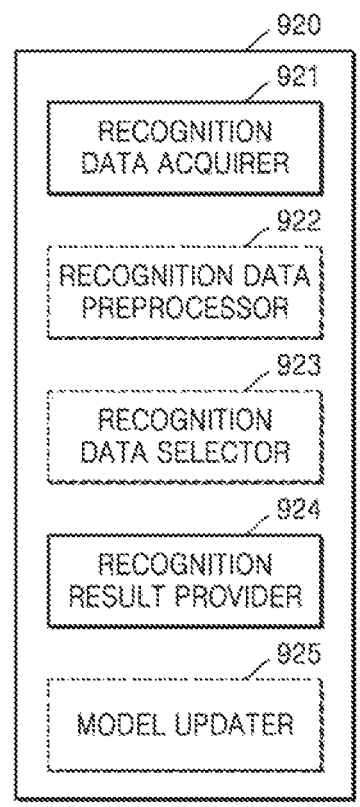

ELECTRONIC DEVICE AND FEEDBACK INFORMATION ACQUISITION METHOD THEREFOR

TECHNICAL FIELD

The present disclosure relates to an electronic device for acquiring feedback information and a feedback information acquisition method therefor.

Also, the present disclosure relates to an artificial intelligence (AI) system for simulating functions of a human brain, such as recognition and determination, by using machine learning algorithms.

BACKGROUND ART

Recently, artificial intelligence systems that implement human-level intelligence have been used in various fields. Unlike existing rule-based smart systems, artificial intelligence systems are smart systems in which a machine performs learning and determination by itself. As the use of the artificial intelligence systems is increased, recognition rates of the artificial intelligence systems may be improved and a user's preference may be understood more accurately. Therefore, the existing rule-based smart systems are gradually replaced with deep learning-based artificial intelligence systems.

Artificial intelligence technology includes machine learning (e.g., deep learning) and element technologies using machine learning.

Machine learning is an algorithm technology for classifying and learning characteristics of input data by itself. The element technology is a technology for simulating functions of a human brain, such as recognition and determination, by using machine learning algorithms. The element technology includes technical fields such as linguistic understanding, visual understanding, inference or prediction, knowledge representation, and motion control.

Various fields to which artificial intelligence technology is applied are as follows. Linguistic understanding is technology for recognizing, applying, and processing human language and characters and includes natural language processing, machine translation, dialogue system, query and answer, voice recognition and synthesis, and the like. Visual understanding is technology for recognizing and processing objects like human vision and includes object recognition, object tracking, image search, person recognition, scene understanding, spatial understanding, image enhancement, and the like. Inference or prediction is technology for determining, logically inferring, and predicting information and includes knowledge/probability-based inference, optimization prediction, preference-based planning, recommendation, and the like. Knowledge representation is technology for automatically processing human experience information into knowledge data and includes knowledge construction (data generation and classification), knowledge management (data utilization), and the like. Motion control is a technique for controlling autonomous driving of vehicles and movement of robots and includes movement control (navigation, collision, driving, etc.), operation control (behavior control), and the like.

DESCRIPTION OF EMBODIMENTS

Technical Problem

Machine learning may require a large amount of training data. The training data may be classified by, for example, unsupervised learning or an expert's hand design scheme, or whether the training data is validation data may be determined by, for example, unsupervised learning or an expert's hand design scheme.

In this case, in order to generate the training data, it is necessary to effectively classify the training data or determine whether the training data is validation data. Also, even after a learning model is generated, there is a need for a method of continuously improving the performance of the learning model.

According to the present disclosure, a learning model may be generated based on response information of a user. Also, the generated learning model may be used to determine whether a user's command is successful. Also, appropriate function information may be provided by recognizing a user's command and inferring a users intention.

According to the present disclosure, the learning model may be continuously trained. For example, the learning model may be continuously trained based on input feedback information of a user, such as execution cancellation or continuation, and response information of the user.

Therefore, a specific function corresponding to a user action may be executed with high accuracy, and the satisfaction and convenience of a user using an electronic device may be improved.

BRIEF DESCRIPTION OF DRAWINGS

FIGS. 5A, 5B, 5C, 6A, 6B, 7A, and 7B are diagrams illustrating a user terminal using a learning model, according to various embodiments of the present disclosure.

FIGS. 13, 14A, 14B, and 15 are diagrams for describing an embodiment of generating and using a learning model, according to various embodiments of the present disclosure.

BEST MODE

Figure 1:
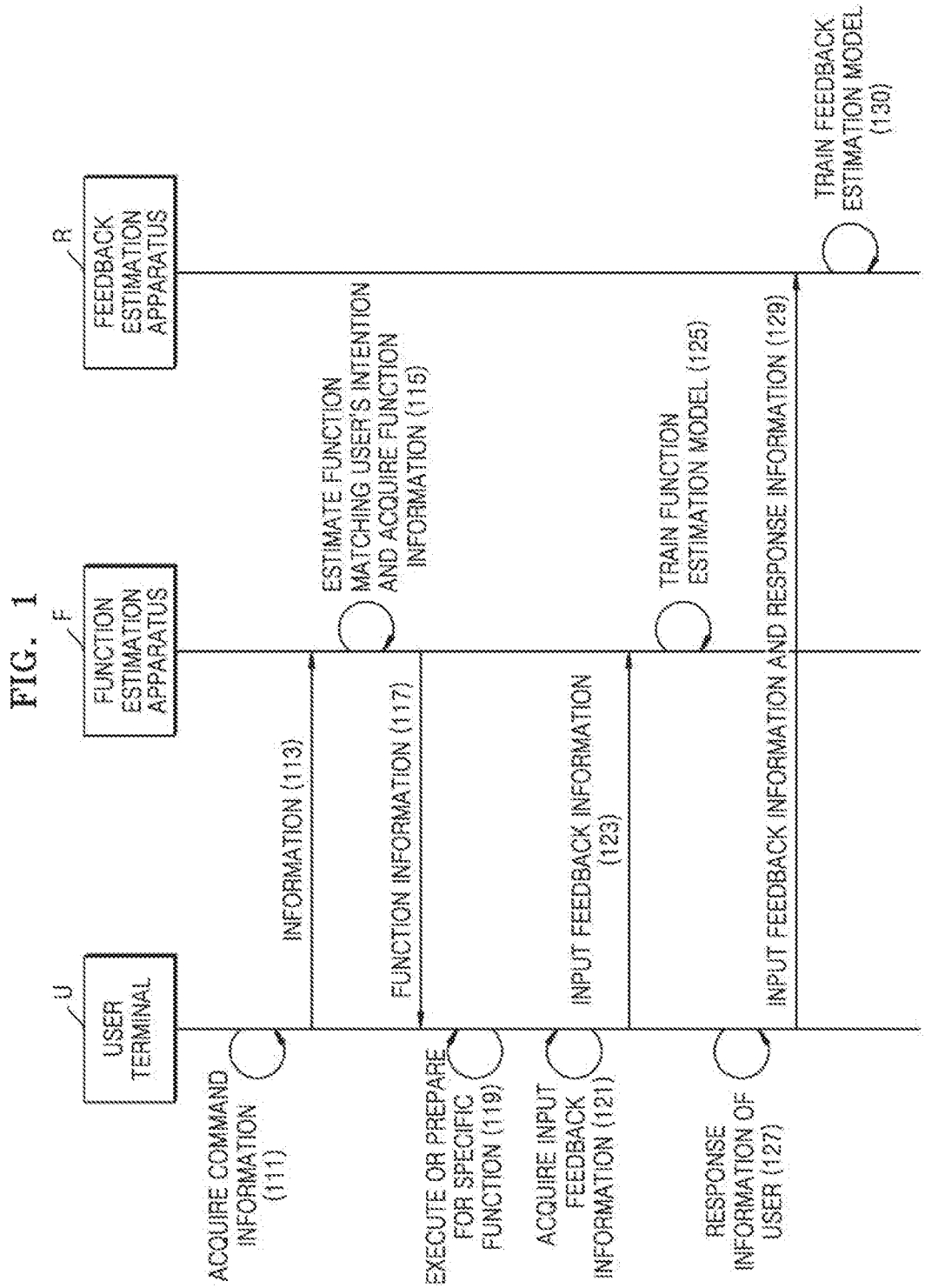
FIGS. 1 and 2 are flowcharts of a system for generating a learning model, according to various embodiments of the present disclosure.

According to an embodiment of the present disclosure, a feedback information acquisition method includes: acquiring input feedback information of a user and first response information of the user, which are related to a specific function; training a feedback estimation model by using the input feedback information and the first response information; acquiring second response information of the user related to the specific function; and acquiring feedback information related to the specific function by applying the second response information to the trained feedback estimation model.

According to an embodiment of the present disclosure, an electronic device includes: a memory configured to store a feedback estimation model; a communicator configured to communicate with an external device; and a processor electrically connected to the memory and the communicator, wherein the processor is configured to: train the feedback estimation model stored in the memory by using input feedback information of a user and first response information of the user, which are related to a specific function, the input feedback information and the first response information being acquired through the communicator; and when second response information of the user related to the specific function is acquired through the communicator, acquire feedback information related to the specific function by applying the second response information to the trained feedback estimation model.

According to an embodiment of the present disclosure, a computer program product includes instructions causing the electronic device of the present disclosure to: acquire input feedback information of a user and first response information of the user, which are related to a specific function; train a feedback estimation model by using the input feedback information and the first response information; acquire second response information of the user, related to the specific function; and acquire feedback information related to the specific function by applying the second response information to the trained feedback estimation model.

Mode of Disclosure

Hereinafter, various embodiments of the present disclosure will be described in detail with reference to the accompanying drawings. However, this is not intended to limit the techniques described in the present disclosure to specific embodiments, and it will be understood to include various modifications, equivalents, and/or alternatives of the embodiments of the present disclosure. In connection with the description of the drawings, similar reference numerals may be used to refer to similar elements.

The expressions "have," "may have," "include," or "may include" as used herein specify the presence of features (e.g., numbers, functions, operations, or elements such as parts), but do not preclude the presence of additional features.

The expressions "A or B," "at least one of A and/or B," or "one or more of A and/or B" as used herein may include all possible combinations of items listed together. For example, "A or B," "at least one of A and B," or "at least one of A or B" may indicate (1) a case in which at least one A is included, (2) a case in which at least one B is included, or (3) a case in which both of at least one A and at least one B are included.

The terms "first," "second," etc. may modify various elements regardless of order and/or importance and are only used to distinguish one element from another. However, these terms do not limit the elements.

When a certain element (e.g., a first element) is "(operatively or communicatively) coupled with/to" or "connected to" another element (e.g., a second element), it will be understood that the certain element may be connected to the other element directly or through another element (e.g., a third element). When a certain element (e.g., a first element) is "directly coupled with/to" or "directly connected to" another element (e.g., a second element), it will be understood that another element (e.g., a third element) is not present between the certain element and the other element.

The expression "configured to" as used herein may be used interchangeably with, for example, "suitable for," "having the capacity to," "designed to," "adapted to," "made to," or "capable of" according to a situation. The term "configured to" may not necessarily mean only "specifically designed to" in hardware. Instead, in some situations, the expression "device configured to perform an operation" may mean that the device "can perform an operation" along with other devices or elements. For example, the phrase "auxiliary processor configured to perform A, B, and C" may refer to a dedicated processor (e.g., an embedded processor) that performs these operations or a general-purpose processor (e.g., a central processing unit (CPU) or an application processor) that is capable of performing these operations by executing one or more software programs stored in a memory device.

An electronic device according to various embodiments of the present disclosure may include, for example, at least one of smartphones, tablet personal computers (PCs), mobile phones, video phones, e-book readers, desktop PCs, laptop PCs, netbook computers, workstations, servers, personal digital assistants (PDAs), portable multimedia players (PMPs), MP3 players, medical devices, cameras, or wearable devices. In some embodiments, the electronic device may include, for example, at least one of televisions, digital video disk (DVD) players, audio players, refrigerators, air conditioners, cleaners, ovens, microwave ovens, washing machines, air purifiers, set-top boxes, home automation control panels, security control panels, media boxes (e.g., Samsung HomeSync™, Apple TV™, or Google TV™), game consoles (for example. Xbox™, PlayStation™, etc.), electronic dictionaries, electronic keys, camcorders, or electronic frames. In another embodiment, the electronic device may include at least one of various medical devices (e.g., various portable medical measuring devices (blood glucose meters, heart rate monitors, blood pressure monitors, or body temperature meters, etc.), magnetic resonance angiography (MRA), magnetic resonance imaging (MRI), computed tomography (CT), cameras, ultrasonic devices, etc.), navigation devices, global navigation satellite systems (GNSSs), event data recorders (EDRs), flight data recorders (FDRs), automotive infotainment devices, ship electronic equipment (e.g., ship navigation systems, gyro compasses, etc.), avionics, security devices, vehicle head units, industrial or home robots, drones, automated teller machines (ATMs) in financial institutions, point of sales (POS) in stores, or Internet of Things (IoT) devices (e.g., light bulbs, various sensors, sprinkler devices, fire alarms, thermostats, street lights, toasters, exercise equipment, hot water tanks, heaters, boilers, etc.).

In the present disclosure, the term "user" may refer to a person who uses the electronic device or a device (e.g., an artificial intelligence electronic device) that uses the electronic device.

FIG. 1 is a flowchart of a system for generating a learning model, according to an embodiment of the present disclosure.

In FIG. 1, the system may include a user terminal U, a function estimation apparatus F, and a feedback estimation apparatus R.

In this case, the function estimation apparatus F and the feedback estimation apparatus R may be different apparatuses or may be the same apparatus. Also, at least one of the function estimation apparatus F and the feedback estimation apparatus R may be present in the form of a server or a cloud and may be present as a part of the user terminal U.

The function estimation apparatus F may include at least one of a software module, a hardware module, and a processor, which train or use a function estimation model. The function estimation model may be a learning model configured to acquire (or estimate or infer) a function intended by a user by recognizing command information of a user according to a user action for executing a specific function. The function estimation model may be stored in a storage of the function estimation apparatus F or may be stored in an external database communicatively connected to the function estimation apparatus F.

The feedback estimation apparatus R may include at least one of a software module, a hardware module, and a processor, which train or use a feedback estimation model. The feedback estimation model may be a learning model configured to acquire (or estimate or infer) feedback information of the user, related to a specific function, by recognizing response information of the user when the specific function is executed or prepared. The feedback estimation model may be stored in a storage of the feedback estimation apparatus R or may be stored in an external database communicatively connected to the feedback estimation apparatus R.

In the present disclosure, training the model may include generating a new model or updating an existing trained model.

Also, the function estimation model and the feedback estimation model of the present disclosure may be implemented as a single learning model or may be implemented as separate learning models.

Also, the function estimation model and the feedback estimation model of the present disclosure may be, for example, a neural network-based learning model. The neural network-based learning model may be designed to simulate a human brain structure on a computer and may include a plurality of network nodes having weights so as to simulate human neurons. Also, the network nodes may form a connection relationship such that the neurons simulate the synaptic activity of the neurons that exchange signals through synapses.

Furthermore, the function estimation model and the feedback estimation model of the present disclosure may each include a deep learning model evolved from a neural network model. In the deep learning model, a plurality of network nodes may be located at different depths (or layers) and exchange data according to a convolutional connection relationship.

In addition, the function estimation model and the feedback estimation model of the present disclosure may each include a deep neural network (DNN), a recurrent neural network (RNN), a bidirectional recurrent deep neural network (BRDNN), and the like, but the present disclosure is not limited to the above-described examples.

In FIG. 1, the user terminal U may acquire command information of the user according to a user action for executing a specific function (111). For example, when the user action is an action of uttering a voice, the command information of the user may include voice data according to a user's voice.

The user terminal U may transmit the acquired command information to the function estimation apparatus F (113). The function estimation apparatus F may acquire function information including information on a specific function to be executed corresponding to the command information of the user, based on the received command information. For example, the function estimation apparatus F may acquire the function information as estimation data, which is a result of estimating the function matching the user's intention, by using the received voice data as input data of the trained function estimation model as recognition data (115).

When the function information is acquired, the function estimation apparatus F may transmit the acquired function information to the user terminal U (117).

The user terminal U may execute the specific function or prepare to execute the specific function, based on the received function information (119).

For example, when the user's voice in operation 111 is "Find photos taken in XX month in the album," the user terminal U may search for photos taken in XX month as the execution of the specific function and execute a viewer application to display the found photos. Alternatively, the user terminal U may execute a "gallery application" as preparation for executing the specific function to display a confirmation message "Do you want to display the photos taken in XX month?"

When the specific function is being executed or prepared, the user terminal U may acquire input feedback information input by the user as explicit feedback related to the specific function (121).

For example, while the particular function is being executed, the user may select an execution continuation user interface (UI) or an execution cancellation UI. Alternatively, when a confirmation message is displayed as preparation of the specific function, the user may select the execution continuation UI or the execution cancellation UI. In this case, the user terminal U may acquire selection information of the user as the input feedback information. For example, the input feedback information may include execution success information corresponding to the selection information of the user who has selected the execution continuation UI or include execution failure information corresponding to the selection information of the user who has selected the execution cancellation UI.

The user terminal U may transmit the acquired input feedback information to the function estimation apparatus F (123).

The function estimation apparatus F may train the function estimation model by using, as training data, the command information received in operation 113 according to the user action for executing the specific function and the input feedback information received in operation 123 (125).

The user terminal U may acquire response information of the user as implicit feedback related to the specific function (127). The response information of the user may be acquired while the specific function is executed, may be acquired during preparation of the specific function, or may be acquired while the user inputs the feedback. For example, the user terminal U may acquire response information of the user within a certain period of time (e.g., within three seconds) after the specific function is executed. Alternatively, the user terminal U may display a confirmation message as preparation of the specific function and acquire response information of the user within a certain period of time (e.g., within three seconds). Alternatively, in a state in which the confirmation message is displayed, the user terminal U may receive explicit feedback from the user and acquire response information of the user within a certain period of time (e.g., within three seconds).

The response information of the user may include, for example, at least one of facial information of the user photographed by a camera provided in the user terminal U, user voice information recorded by a microphone provided in the user terminal U, and an acceleration value or a geomagnetic value measured by a sensor provided in the user terminal U. Also, the response information of the user may be information acquired by processing the facial information, the voice information, and the acceleration values or the geomagnetic value. For example, when the facial information of the user is an image, the response information of the user may include feature information (e.g., facial expression information) of the user from whom the facial information is recognized.

The user terminal U may transmit, to the feedback estimation apparatus R, the input feedback information acquired in operation 121 and the response information acquired in operation 127 (129). In this case, the input feedback information may be transmitted to the feedback estimation apparatus R before operation 129. Alternatively, in operation 123, the function estimation apparatus F may transmit, to the feedback estimation apparatus R, the input feedback information received from the user terminal U.

The feedback estimation apparatus R may train the feedback estimation model by using the input feedback information and the response information as the training data (130).

Moreover, the user terminal U may store the input feedback information and the response information in a database (not illustrated) communicatively connected to the feedback estimation apparatus R. In this case, the feedback estimation apparatus R may acquire the input feedback information and the response information of the user, stored in the database at a certain period, or when a specific event occurs, and may train the feedback estimation model by using the input feedback information and the response information of the user.

Figure 2:
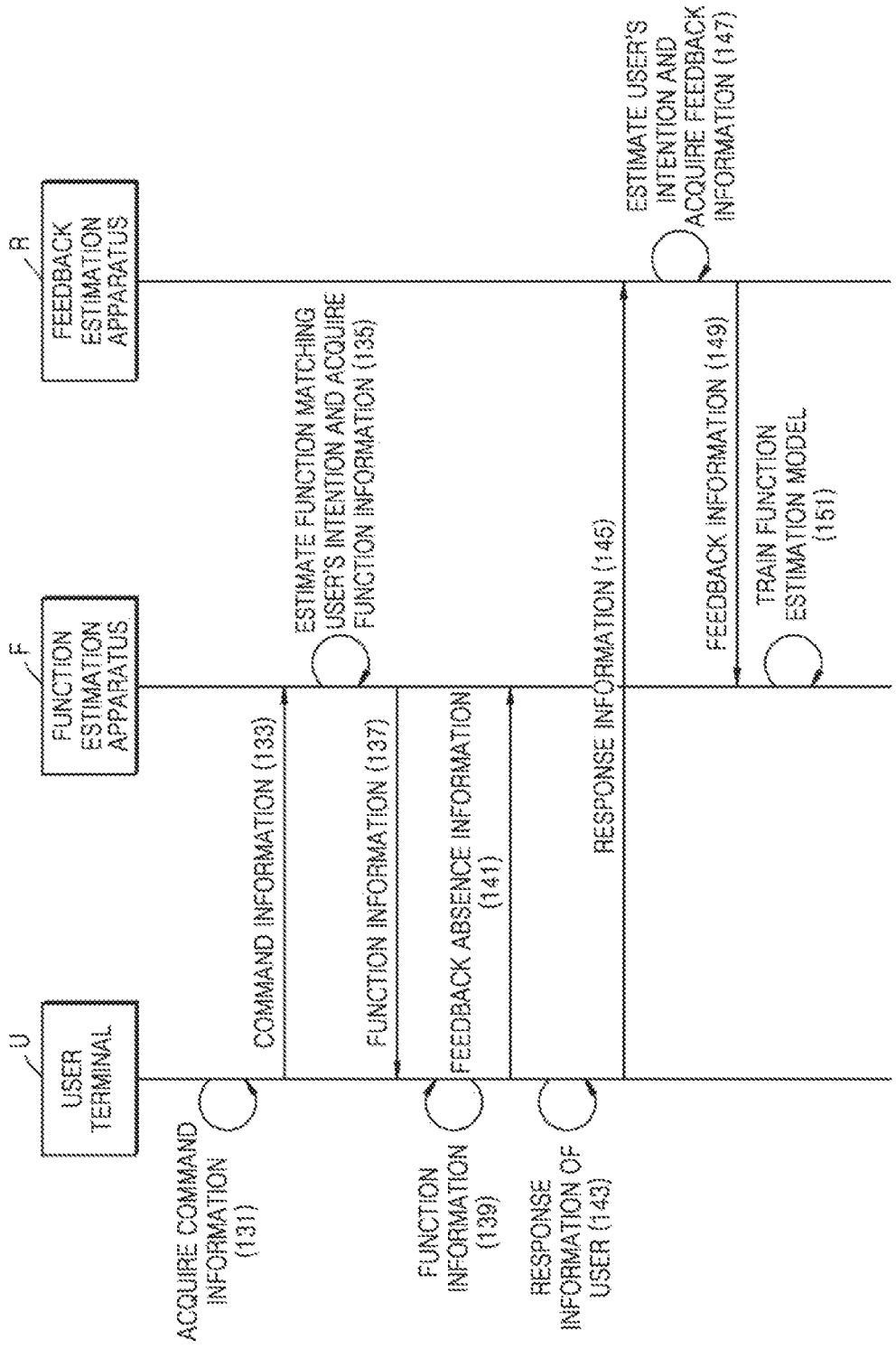

FIG. 2 is a flowchart of a system for generating a learning model, according to another embodiment of the present disclosure.

In FIG. 2, the system may include a user terminal U, a function estimation apparatus F, and a feedback estimation apparatus R. Since the user terminal U, the function estimation apparatus F, and the feedback estimation apparatus R of FIG. 2 correspond to the user terminal U, the function estimation apparatus F, and the feedback estimation apparatus R of FIG. 1, a redundant description thereof will be omitted. First, when the user terminal U acquires command information of a user and transmits the acquired command information to the function estimation apparatus F and the function estimation apparatus F transmits, to the user terminal U, function information to be executed according to the command information of the user, the user terminal U may execute a specific function or prepare to execute the specific function (131 to 139). Since operations 131 to 139 correspond to operations 111 to 119 of FIG. 1, a redundant description thereof will be omitted.

In this situation, the user may not perform separate explicit feedback related to the specific function for a certain period of time (e.g., for two seconds). In this case, when a certain time elapses, the user terminal U may transmit, to the function estimation apparatus F, feedback absence information indicating that there is no feedback input by the user with respect to execution or preparation of the specific function (141).

Also, the user terminal U may acquire the response information of the user as implicit feedback related to the specific function (143). Since an embodiment of acquiring the response information and an example of the response information correspond to those described above with reference to FIG. 1, a redundant description thereof will be omitted.

The user terminal U may transmit the acquired response information to the feedback estimation apparatus R (145). The feedback estimation apparatus R may acquire feedback information by estimating a user's intention related to the specific function provided in operation 139 through the feedback estimation model (147). For example, the feedback estimation apparatus R may apply the acquired response information of the user to the feedback estimation model.

The feedback estimation apparatus R may acquire the feedback information related to the specific function provided in operation 139 as a user intention estimation result of the feedback estimation model using the response information of the user as an input value. The feedback information may include, for example, execution success information or execution failure information in which the user's intention is estimated with respect to the execution or preparation of the specific function. Specifically, the execution success information may be information indicating an intention of a user who wants to continue executing the specific function, and the execution failure information may include information indicating an intention of a user to indicate the execution stop or cancellation of the specific function.

The feedback estimation apparatus R may transmit the acquired feedback information of the user to the function estimation apparatus F that estimates function information to be used by the user (149).

The function estimation apparatus F may train the function estimation model by using the feedback information of the user (151). For example, the function estimation model may update the previously trained function estimation model by using the feedback information of the user as the training data of the trained function estimation model.

FIGS. 3A to 4B are diagrams illustrating data used in the learning model, according to an embodiment of the present disclosure.

Figure 3A:
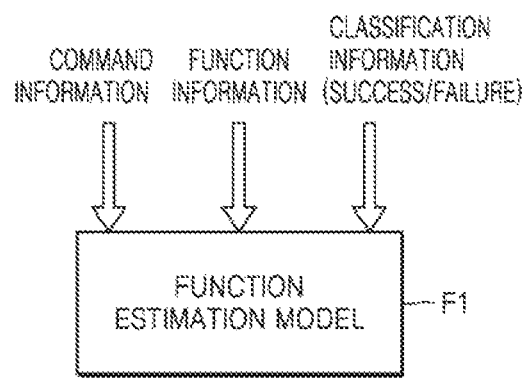
FIGS. 3A, 3B, 4A, and 4B are diagrams illustrating data used in a learning model, according to various embodiments of the present disclosure.
Figure 3B:
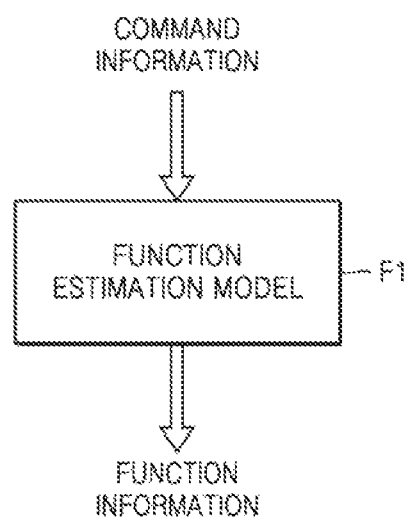

FIG. 3A is a conceptual diagram illustrating training of a function estimation model F1, and FIG. 3B is a conceptual diagram illustrating using of the trained function estimation model F1.

Also, in FIG. 3A, the function estimation apparatus F may train the function estimation model F1 by using, as training data, command information according to a user action for executing a specific function, a training data pair including function information corresponding to the command information, and classification information about the training data pair. In this case, the classification information may include execution success information or execution failure information. Specifically, when the function information corresponding to the command information does not match a user's intention, the classification information about the training data pair may include execution failure information. Also, when the function information corresponding to the command information matches the user's intention, the classification information about the training data pair may include execution success information.

The training data pair and the classification information may be previously stored in a database and used to train the function estimation model F1 periodically or when an event occurs. In this case, the training data pair and the classification information may be stored in the database in association or link with each other, and the classification information may be labeled and stored as a label for the training data pair.

Also, the function estimation model F1 may be initially trained in an unsupervised learning or hand design manner. However, thereafter, the function estimation model F1 may be continuously updated so as to be customized for the user by the training data pair and the classification information described above.

When the function estimation model F1 is trained, the function estimation apparatus F may input, to the trained function estimation model F1, command information according to a user action for executing the specific function as recognition data, as illustrated in FIG. 3B. The function estimation apparatus F may acquire function information corresponding to the command information of the user as estimation data acquired by estimating the user's intention.

Figure 4A:
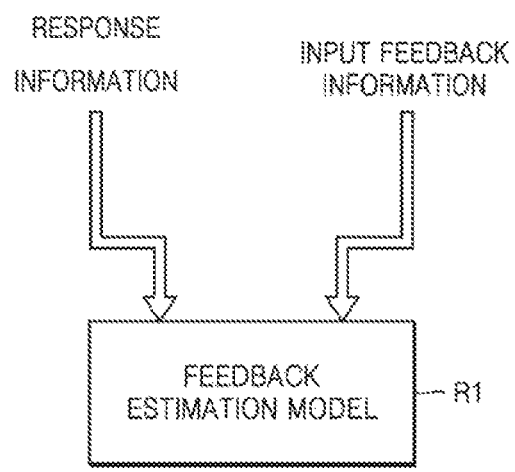
Figure 4B:
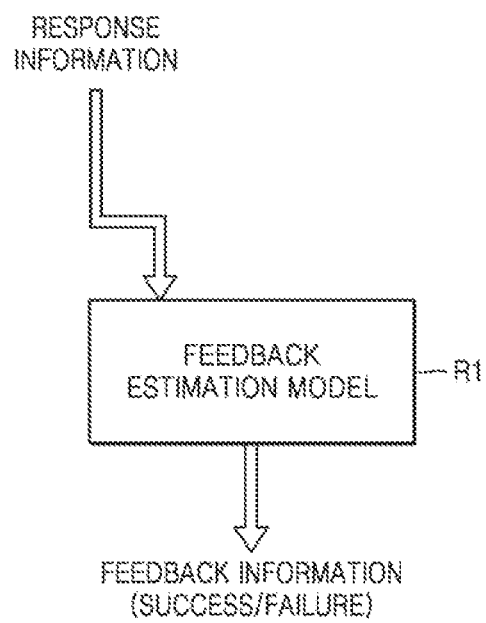

FIG. 4A is a conceptual diagram illustrating training of a feedback estimation model, and FIG. 4B is a conceptual diagram illustrating using of the trained feedback estimation model.

In FIG. 4A, the feedback estimation apparatus R may train the feedback estimation model R1 by using the training data pair including the response information of the user, related to the specific function, and the input feedback information of the user, related to the specific function.

The input feedback information of the user may include execution success information corresponding to selection information of a user who has selected the execution continuation UI with respect to the execution or preparation of the specific function or execution failure information corresponding to selection information of a user who has selected the execution cancellation UI with respect to the execution or preparation of the specific function.

Meanwhile, the response information and the input feedback information may be previously stored in a database and used to train the feedback estimation model R1 periodically or when an event occurs. In this case, the response information and the input feedback information may be stored in the database in association or link with each other, and the input feedback information may be labeled and stored as a label for the response information.

Also, the feedback estimation model R1 may be initially trained in an unsupervised learning or hand design manner. However, thereafter, the feedback estimation model R1 may be continuously updated so as to be customized for the user by the training data pair and the classification information described above.

When the feedback estimation model R1 is trained, the feedback estimation apparatus R may input, to the trained feedback estimation model R1, response information of the user related to the specific function as recognition data, as illustrated in FIG. 4B. The feedback estimation apparatus R may acquire feedback information corresponding to the response information of the user as estimation data acquired by estimating the user's feedback. The feedback information may include execution success information or execution failure information in which the user's feedback is estimated with respect to the execution or preparation of the specific function.

FIGS. 5A to 7B are diagrams illustrating a user terminal using a learning model, according to an embodiment of the present disclosure.

First, in FIG. 5A, a user may utter a voice as a user action for executing a specific function (e.g., a photo search function). For example, the user may utter a voice "Find my photos in the album." The user terminal U may transmit, to a function estimation apparatus F, command information acquired according to the user's voice.

The function estimation apparatus F may acquire function information, which is a result of estimating a function that the user wants to execute, as a user's intention corresponding to the received command information of the user.

Also, as illustrated in FIG. 5B, the user terminal U may display, on a display, a result of recognizing the user's voice as preparation for executing a specific function. At this time, the user terminal U may incorrectly recognize the user's voice. For example, the user terminal U may incorrectly recognize the word 'my' as the word "hawk" in the user's voice and display a confirmation message 311 "I will find hawk photos in the album."

As illustrated in FIG. 5C, the user terminal U may search for "hawk" photos from the user's photo album (or storage) stored in the user terminal U or an external server as the execution of the specific function and may execute a viewer application to display the found photos 312.

In this case, as illustrated in FIG. 6A, the user terminal U may acquire response information of the user, which is implicit feedback on execution of a specific function. For example, the user terminal U may acquire, as the response information, facial information of the user with respect to the found photo by using a camera provided on a front surface of the user terminal U.

In this case, the facial information may include facial expression information about a user's face. The facial expression information may include, for example, state information about an uncomfortable facial expression (e.g., a disappointed expression, an annoying expression, an angry expression, an absurd expression, a frustrated expression, and the like) when viewing unwanted information because a photo different from a photo searched for by voice is found.

In FIG. 6B, the user terminal U may transmit the acquired response information of a user to the feedback estimation apparatus R.

The feedback estimation apparatus R may apply the response information to the feedback estimation model to acquire feedback information that is a result of estimating a user's feedback on execution of a specific function. In this case, the feedback information may include execution failure information indicating failure to execute the specific function.

The feedback estimation apparatus R may transmit the acquired feedback information to the function estimation apparatus F that estimates a function that the user intends to execute.

The function estimation apparatus F may train the function estimation model by using the command information "Find my photos in the album" and the feedback information indicating execution failure as the classification information about the training data pair including the function information including the function of searching for the "hawk" photos and executing the viewer application to display the found photos as the function estimated according to the command information.

Alternatively, when the user terminal U displays the found photos in FIG. 5C, the feedback estimation apparatus R may acquire input feedback information of the user according to a user action of selecting a cancellation UI 313 as the explicit feedback on the execution of the specific function, as illustrated in FIG. 7A.

Also, the user terminal U may acquire the response information of the user when the user selects the cancellation UI 313 or within a certain period of time (e.g., within two seconds) after the user selects the cancellation UI 313.

In FIG. 7B, the user terminal U may transmit, to the feedback estimation apparatus R, input feedback information of the user who cancels the execution of the specific function and response information of the user when the user cancels the execution of the specific function. The input feedback information may include, for example, execution failure information corresponding to selection information of the user who has selected the execution cancellation UI.

The feedback estimation apparatus R may train the feedback estimation model by using the input feedback information and the response information.

Figure 8:
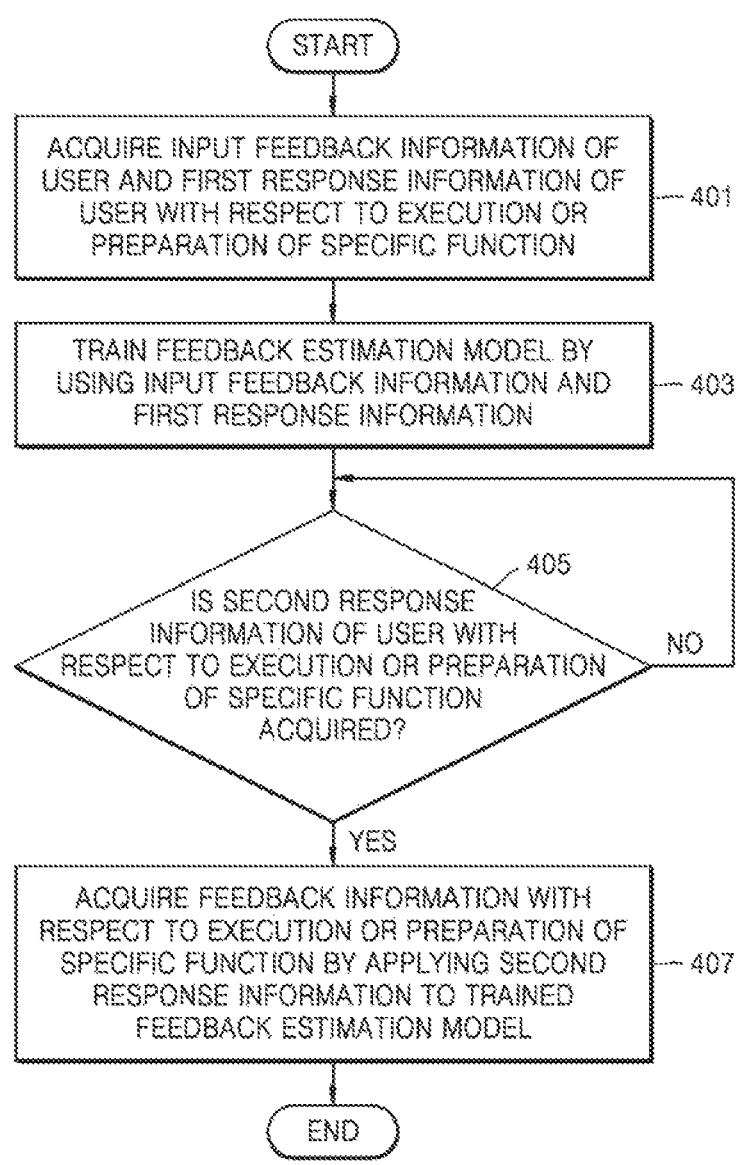
FIG. 8 is a flowchart of a feedback estimation apparatus according to various embodiments of the present disclosure.

FIG. 8 is a flowchart of a feedback estimation apparatus R according to various embodiments of the present disclosure.

First, the feedback estimation apparatus R may acquire input feedback information of the user and first response information of the user, which are related to a specific function (401).

Next, the feedback estimation apparatus R may train a feedback estimation model by using the acquired input feedback information and the acquired first response information (403). For example, the input feedback information may include execution success information corresponding to selection information of a user who has selected an execution continuation UI with respect to the execution or preparation of the specific function or execution failure information corresponding to selection information of a user who has selected an execution cancellation UI with respect to the execution or preparation of the specific function.

In a state in which the feedback estimation model is trained, the feedback estimation apparatus R may determine whether second response information of the user related to the specific function is acquired (405). In this case, the trained feedback estimation model may be a model configured to provide feedback information as estimation data, which is a result of estimating a user's feedback, by using the response information of the user as recognition data.

When second response information of the user is acquired (YES in 405), the feedback estimation apparatus R may acquire feedback information related to the specific function by applying the second response information to the trained feedback estimation model (407). The feedback information may include, for example, execution success information or execution failure information in which the user's feedback is estimated with respect to the execution or preparation of the specific function.

The feedback estimation apparatus R may transmit the acquired feedback information to a function estimation apparatus F that acquires function information to be executed by using command information of the user. The function estimation apparatus F may train the function estimation model by using the received feedback information.

According to various embodiments, the first response information and the second response information may be acquired while the specific function is executed, may be acquired during preparation of the specific function, or may be acquired while the user inputs the feedback. The first response information and the second response information may be information based on at least one of facial information of the user and voice information of the user, which are related to the specific function. For example, the facial information may include facial expression information of the user related to the specific function.

Also, the input feedback information, the first response information, and the second response information may correspond to input feedback information of the user, first response information of the user, and second response information of the user, which are related to the specific function provided by the user terminal U wirelessly connected to the feedback estimation apparatus R, respectively.

Figure 9:
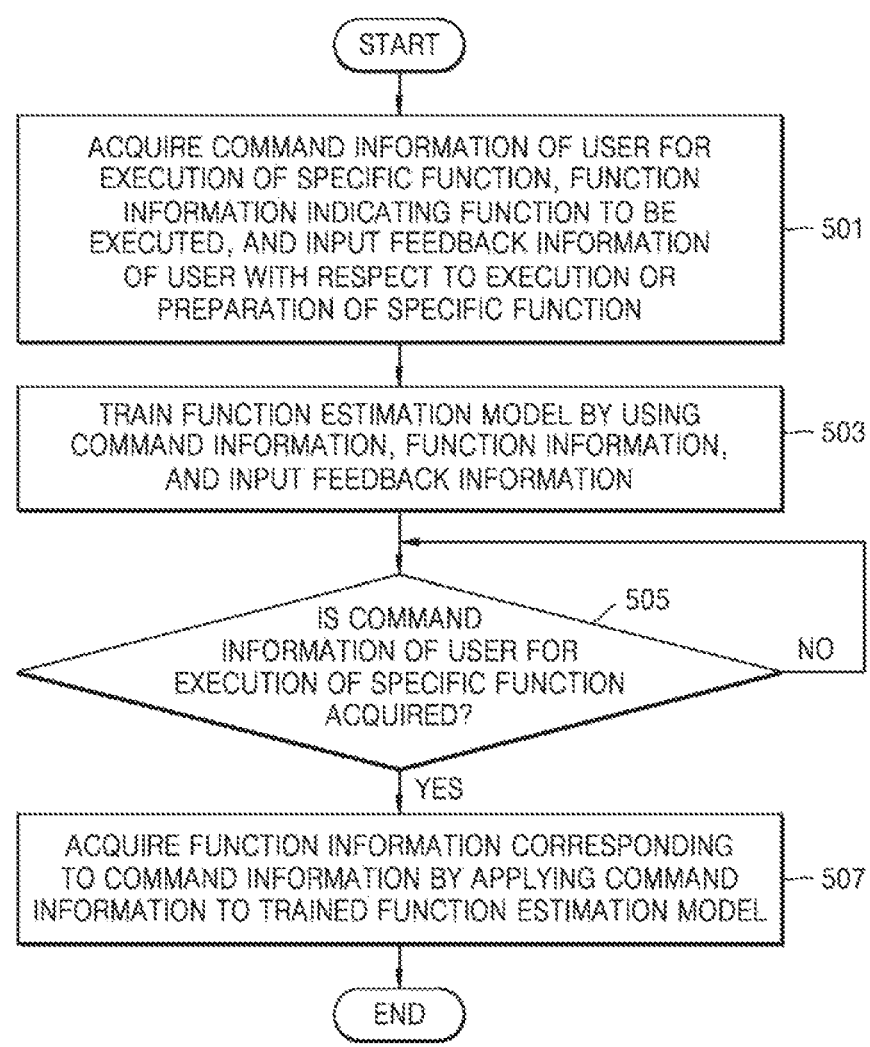
FIG. 9 is a flowchart of a function estimation apparatus according to various embodiments of the present disclosure.

FIG. 9 is a flowchart of a function estimation apparatus F according to various embodiments of the present disclosure.

First, the function estimation apparatus F may acquire command information of the user for execution of a specific function, function information indicating a function to be executed, and input feedback information of the user related to the specific function (501).

Next, the function estimation apparatus F may train the function estimation model by using the acquired command information, the acquired function information, and the acquired input feedback information (503).

In a state in which the function estimation model is trained, the function estimation apparatus F may determine whether the command information of the user, related to the execution of the specific function, is acquired (505).

When the command information of the user is acquired (YES in 505), the function estimation apparatus F may acquire function information corresponding to the command information by applying the command information to the trained function estimation model (507).

Figure 10:
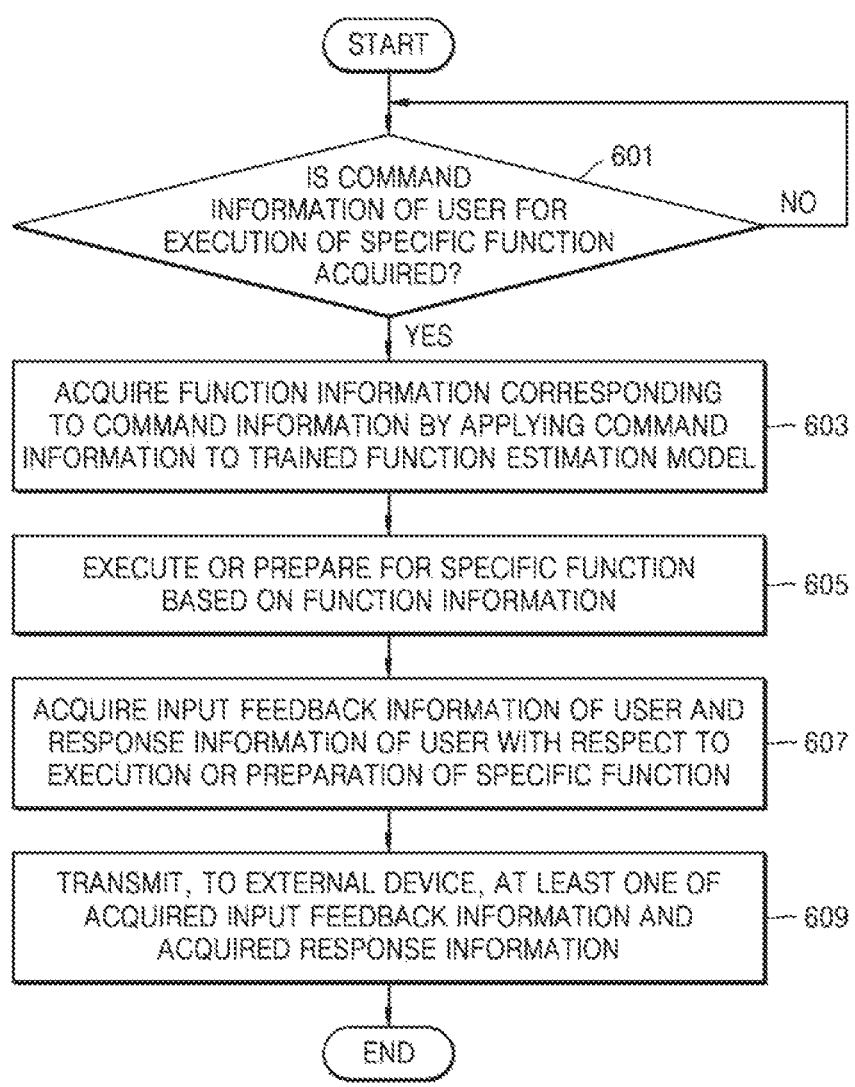
FIG. 10 is a flowchart of the user terminal according to various embodiments of the present disclosure.

FIG. 10 is a flowchart of a user terminal U according to various embodiments of the present disclosure.

First, the user terminal U may determine whether command information of the user for execution of a specific function is acquired (601).

When the command information of the user is acquired (YES in 601), the user terminal U may acquire function information corresponding to the command information by applying the command information to the trained function estimation model (603).

Next, the user terminal U may execute the specific function or prepare for the specific function, based on the acquired function information (605).

The user terminal U may acquire input feedback information of the user and response information of the user, which are related to the specific function (607).

The user terminal U may transmit, to an external device, at least one of the acquired input feedback information and the acquired response information (609). The external device may be, for example, the function estimation apparatus F or the feedback estimation apparatus R.

Figure 11:
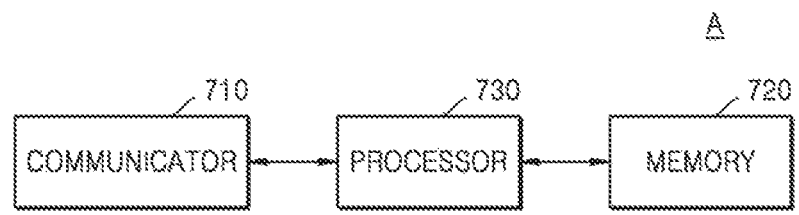
FIG. 11 is a block diagram of an electronic device according to various embodiments of the present disclosure.

FIG. 11 is a block diagram of an electronic device according to various embodiments of the present disclosure. The electronic device A of FIG. 11 may correspond to, for example, the function estimation apparatus F and the feedback estimation apparatus R of the present disclosure.

In FIG. 11, the electronic device A may include a communicator 710, a memory 720, and a processor 730. The configuration of the electronic device A illustrated in FIG. 11 is merely an example, and the present disclosure is not necessarily limited to the above-described block diagram. Therefore, a part of the configuration of the electronic device A illustrated in FIG. 11 may be omitted, modified, or added according to the type or purpose of the electronic device A.

The communicator 710 may support establishment of a wired or wireless communication channel between various types of external devices according to various types of communication schemes and may support communication through the established communication channel. In this case, the external device may be, for example, at least one of the function estimation apparatus F, the feedback estimation apparatus R, and the user terminal U of the present disclosure.

The communicator 710 may include one or more communication processors that operate independently of the processor 730 (e.g., an application processor) and support wired communication or wireless communication. In an embodiment, the communicator 710 may include a wireless communication module (e.g., a cellular communication module, a short-range wireless communication module, or a global navigation satellite system (GNSS) communication module) or a wired communication module (e.g., a local area network (LAN) communication module or a power line communication module), and may use the corresponding communication module to communicate with an external device through a first network (e.g., a short-range communication network such as Bluetooth, Wi-Fi direct, or an infrared data association (IrDA)) or a second network (e.g., a long-range communication network such as a cellular network, the Internet, or a computer network (e.g., a LAN or wide area network (WAN)). The various types of communication modules described above may be implemented as a single chip or separate chips.

The memory 720 may store various programs and data necessary for the operation of the electronic device A. The memory 720 may be implemented as at least one of a non-volatile memory and a volatile memory. The memory 720 may be accessed by the processor 730, so that reading, writing, modifying, deleting, or updating of data is performed by the processor 730. In the present disclosure, the memory 720 may include not only flash memory, a hard disk drive (HDD), or a solid state drive (SSD) but also read-only memory (ROM) (not illustrated) or random access memory (RAM) (not illustrated) inside the processor 730 or memory card (not illustrated) (e.g., micro secure digital (SD) card or memory stick) mounted in the electronic device A.

Also, the memory 720 may store a learning model according to the present disclosure. For example, when the electronic device A is the function estimation apparatus F, the function estimation model may be stored in the memory 720. Alternatively, when the electronic device A is the feedback estimation apparatus R, the feedback estimation model may be stored in the memory 720.

Also, the memory 720 may store a program including instructions configured to acquire the feedback information according to the present disclosure. For example, the memory 720 may store a program including instructions configured to acquire input feedback information of a user and first response information of the user, which are related to a specific function, train a feedback estimation model by using the input feedback information and the first response information, acquire second response information of the user, related to the specific function, and acquire feedback information related to the specific function by applying the second response information to the trained feedback estimation model.

The processor 730, for example, may drive software (e.g., a program) to control at least one other element (e.g., hardware or software element) of the electronic device A connected to the processor 730 and may perform a variety of data processing and operations. For example, the processor 730 may load a command or data received from the communicator 710 into a volatile memory, process the command or data, and store resultant data in a non-volatile memory. In an embodiment, the processor 730 may include a main processor (e.g., a central processing unit or an application processor) and an auxiliary processor (e.g., a graphics processing device, an image signal processor, a sensor hub processor, or a communication processor) that operates independently of the main processor, and additionally or alternatively, uses lower power than the main processor, or is specialized for a designated function. The auxiliary processor may operate separately from the main processor or may be embedded into the main processor.

In various embodiments, when the feedback estimation model is stored in the memory 720, the processor 730 may train the feedback estimation model stored in the memory 720 by using the input feedback information of the user and the first response information of the user, which are related to the specific function, the input feedback information and the first response information being acquired through the communicator 710. When the second response information of the user related to the specific function is acquired through the communicator 710, the processor 730 may acquire feedback information related to the specific function by applying the second response information to the trained feedback estimation model. The processor 730 may control the communicator 710 such that the acquired feedback information is transmitted to the function estimation apparatus F that acquires the function information to be executed by using the command information of the user. In this case, the function estimation apparatus F may train the function estimation model by using the received feedback information.

In various embodiments, when the function estimation model is stored in the memory 720, the processor 730 may acquire command information of the user for execution of a specific function, function information indicating a function to be executed, and input feedback information of the user related to the specific function through the communicator 710. The processor 730 may train the function estimation model stored in the memory 720 by using the acquired command information, the acquired function information, and the acquired input feedback information. When the command information of the user for the execution of the specific function is acquired through the communicator 710, the processor 730 may acquire function information corresponding to the command information by applying the command information to the trained function estimation model.

Figure 12:
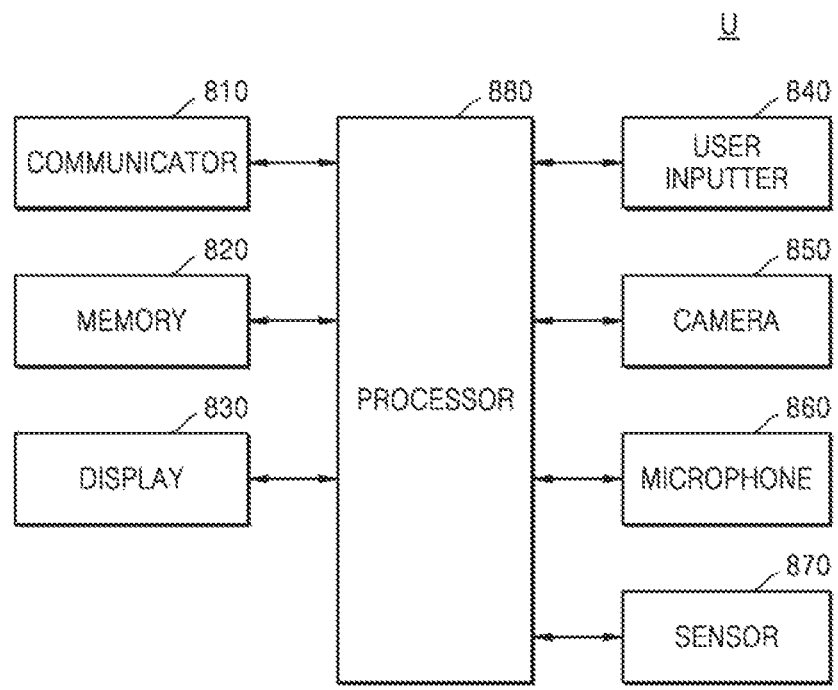
FIG. 12 is a block diagram of the user terminal according to various embodiments of the present disclosure.

FIG. 12 is a block diagram of a user terminal U according to various embodiments of the present disclosure.

The user terminal U may include a communicator 810, a memory 820, a display 830, a user inputter 840, a camera 850, a microphone 860, a sensor 870, and a processor 880. Since the configuration of the user terminal U illustrated in FIG. 12 is merely an example, the present disclosure is not necessarily limited to the above-described block diagram. Therefore, a part of the configuration of the user terminal U illustrated in FIG. 12 may be omitted, modified, or added according to the type or purpose of the user terminal U.

The communicator 810 may support establishment of a wired or wireless communication channel between various types of external devices according to various types of communication schemes and may support communication through the established communication channel. In this case, the external device may be, for example, at least one of the function estimation apparatus F and the feedback estimation apparatus R of the present disclosure.

The communicator 810 may include one or more communication processors that operate independently of the processor 880 and support wired communication or wireless communication. In an embodiment, the communicator 810 may include a wireless communication module or a wired communication module and may use the corresponding communication module to communicate with an external device through a short-range communication network or a long-range communication network. The various types of communication modules described above may be implemented as a single chip or separate chips.

The memory 820 may store various programs and data necessary for the operation of the user terminal U. The memory 820 may be implemented as at least one of a non-volatile memory and a volatile memory. The memory 820 may be accessed by the processor 880, so that reading, writing, modifying, deleting, or updating of data is performed by the processor 880. In the present disclosure, the memory 820 may include not only flash memory, HDD, or SSD but also ROM (not illustrated) or RAM (not illustrated) inside the processor 880 or memory card (not illustrated) mounted on the user terminal U.

The display 830 may display an execution screen or a preparation screen of a specific function of the present disclosure in a display area. The display area may refer to a part of the display 830 exposed through an opening surface of a housing of the user terminal U.

At least a part of the display 830 may be connected to at least one of a front region, a side region, and a rear region of the user terminal U in the form of a flexible display. The flexible display may be bendable, foldable, or rollable without damage through a flexible substrate that is thin like a paper.

The display 830 may be connected to a touch panel (not illustrated) so as to be implemented as a touch screen having a layer structure. The touch screen may have not only a display function but also a function of detecting a touch input position, a touched area, and a touch input pressure. The touch screen may also have a function of detecting not only real touch but also proximity touch.

The user inputter 840 may transmit, to the processor 880, input information according to various user inputs. For example, the user inputter 840 may transmit, to the processor 880, input feedback information of the user according to a user input related to a specific function. Also, the user inputter 840 may transmit, to the processor 880, selection information according to an input of a user who has selected an execution cancellation UI or an execution continuation UI.

The user inputter 840 may include, for example, a touch panel, a (digital) pen sensor, or a key. The touch panel may be, for example, at least one of a capacitive touch panel, a resistive touch panel, an infrared touch panel, or an ultraviolet touch panel. Also, the touch panel may further include a control circuit. The touch panel may further include a tactile layer configured to provide a tactile response to a user. The (digital) pen sensor may be a part of the touch panel or may include a separate recognition sheet. The key may include, for example, a physical button, an optical key, or a keypad.

The camera 850 may capture an image of an external environment and acquire capturing information converted into a data value. For example, the camera 850 may capture an image of a user's face to acquire facial information as response information of the user related to a specific function and transmit the facial information to the processor 880.

The microphone 860 may record an external sound, convert the external sound into a data value to acquire sound information, and transmit the sound information to the processor 880. For example, the microphone 860 may convert a voice for executing a specific function into a digital signal to acquire command information and transmit the command information to the processor 880. Alternatively, the microphone 860 may record a user's voice to acquire voice information as response information of the user related to a specific function and transmit the voice information to the processor 880.

The sensor 870 may generate an electrical signal or a data value corresponding to an operating state (e.g., power or temperature) inside the user terminal U or an external environment state. The sensor 870 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The sensor 870 may acquire, for example, an acceleration value or a geomagnetic value according to a user action as response information of the user related to a specific function and transmit the acceleration value or the geomagnetic value to the processor 880.

The processor 880, for example, may drive software (e.g., a program) to control at least one other element (e.g., hardware or software element) of the user terminal U connected to the processor 880 and may perform a variety of data processing and operations. For example, the processor 880 may load a command or data received from the communicator 810 into a volatile memory, process the command or data, and store resultant data in a non-volatile memory. In an embodiment, the processor 880 may include a main processor (e.g., a central processing unit or an application processor) and an auxiliary processor (e.g., a graphics processing device, an image signal processor, a sensor hub processor, or a communication processor) that operates independently of the main processor, and additionally or alternatively, uses lower power than the main processor, or is specialized for a designated function. The auxiliary processor may operate separately from the main processor or may be embedded into the main processor.

In this case, for example, the auxiliary processor may control at least a part of the functions or states associated with at least one of the elements of the user terminal U on behalf of the main processor while the main processor is in an inactive (e.g., sleep) state or together with the main processor while the main processor is in an active state (e.g., application execution) state.

According to various embodiments, when the command information of the user for the execution of the specific function is acquired through the user inputter 840, the processor 880 may acquire function information corresponding to the command information by applying the command information to the trained function estimation model. The user terminal U may execute the specific function or prepare for the specific function, based on the acquired function information.

In this case, the user terminal U may acquire input feedback information of the user and response information of the user, which are related to the specific function, through at least one of the camera 850, the microphone 860, and the sensor 870. The user terminal U may transmit at least one of the acquired input feedback information and the acquired response information to an external device. The external device may be, for example, the function estimation apparatus F or the feedback estimation apparatus R.

Referring to FIG. 13, the electronic device A or the user terminal U may include at least one of a trainer 910 and a recognizer 920.

The trainer 910 may generate or train a recognition model having a criterion for determining a certain situation. The trainer 910 may generate a recognition model having a determination criterion by using collected training data. The recognition model may correspond to the function estimation model or the feedback estimation model of the present disclosure.

According to the present disclosure, the trainer 910 may train the function estimation model to estimate a function corresponding to command information of the user by using command information according to a user action, a training data pair including function information corresponding to the command information, and classification information about the training data pair.

Also, the trainer 910 may train the feedback estimation model to estimate the user's feedback related to the specific function by using the training data pair including the response information of the user related to the specific function and the input feedback information of the user related to the specific function.

The recognizer 920 may estimate a recognition target included in certain data by using the certain data as recognition data that is the recognition target of the trained recognition model.

According to the present disclosure, the recognizer 920 may acquire function information corresponding to the command information of the user as estimation data acquired by estimating the user's intention by using command information according to a user action of executing a specific function as recognition data of the trained function estimation model.

Also, the recognizer 920 may acquire feedback information corresponding to the response information of the user as estimation data acquired by estimating the users feedback by using the response information of the user related to the specific function as recognition data of the trained feedback estimation model.

At least a part of the trainer 910 and at least a part of the recognizer 920 may be implemented as a software module or manufactured in the form of at least one hardware chip and mounted on the electronic device. For example, at least one of the trainer 910 and the recognizer 920 may be manufactured in the form of a dedicated hardware chip for artificial intelligence (AI) or manufactured as a part of an existing general-purpose processor (e.g., a CPU or an application processor) or a graphics dedicated processor (e.g., a graphics processing unit (GPU)) and mounted on the above-described various electronic devices or object recognition devices. In this case, the dedicated hardware chip for AI is a dedicated processor specialized for probability calculation. Since the dedicated hardware chip has higher parallel processing performance than that of the existing general-purpose processor, it is possible to quickly process computational operations in an AI field such as machine learning. When the trainer 910 and the recognizer 920 are implemented as a software module (or a program module including instructions), the software module may be stored in a non-transitory computer-readable media. In this case, the software module may be provided by an operating system (OS) or may be provided by a certain application. Alternatively, a part of the software module may be provided by an OS, and a remaining part of the software module may be provided by a certain application.

In this case, the trainer 910 and the recognizer 920 may be mounted on a single electronic device or may be respectively mounted on separate electronic devices. For example, one of the trainer 910 and the recognizer 920 may be included in the electronic device A or the user terminal U, and the other thereof may be included in an external server. Also, model information constructed by the trainer 910 may be provided to the recognizer 920 through wired communication or wireless communication, and data input to the recognizer 920 may be provided to the trainer 910 as training data.

FIGS. 14A and 14B are block diagrams of the trainer 910 and the recognizer 920 according to various embodiments.

Referring to FIG. 14A, the trainer 910 may include a training data acquirer 911 and a model trainer 914. Also, the trainer 910 may further include at least one of a training data preprocessor 912, a training data selector 913, and a model evaluator 915.

The training data acquirer 911 may acquire training data necessary for a recognition model that infers a recognition target. According to an embodiment of the present disclosure, the training data acquirer 911 may acquire, as training data, at least one of command information according to a user action, function information corresponding to the command information, and classification information indicating success or failure of the command information and the function information. The training data may be data collected or tested by the trainer 910 or a manufacturer of the trainer 910.

The model trainer 914 may use the training data to train the recognition model to have a determination criterion regarding how to determine a certain recognition target. For example, the model trainer 914 may train the recognition model through supervised learning using at least a part of the training data as the determination criterion. Alternatively, the model trainer 914 may train the recognition model through, for example, unsupervised learning that finds a determination criterion for determining a situation by learning by itself using training data without any supervision. Also, the model trainer 914 may train the recognition model through, for example, reinforcement learning using a feedback on whether a result of determining a situation according to training is correct. Also, the model trainer 914 may train the recognition model by using, for example, a learning algorithm including error back-propagation or gradient descent.

Also, the model trainer 914 may learn a selection criterion regarding what training data has to be used so as to estimate the recognition target by using input data.

When there are a plurality of pre-constructed recognition models, the model trainer 914 may determine, as a recognition model to be trained, a recognition model having a large correlation between input training data and basic training data. In this case, the basic training data may be previously classified according to each data type, and the recognition model may be pre-constructed for each data type. For example, the basic training data may be previously classified based on various criteria such as a region in which the training data is generated, a time at which the training data is generated, a size of the training data, a genre of the training data, a creator of the training data, and a type of an object in the training data.

When the recognition model is trained, the model trainer 914 may store the trained recognition model. In this case, the model trainer 914 may store the trained recognition model in a memory of the electronic device A or the user terminal U. Alternatively, the model trainer 914 may store the trained recognition model in a memory of a server connected to the electronic device A or the user terminal U through a wired or wireless network.

The trainer 910 may further include the training data preprocessor 912 and the training data selector 913 so as to improve an analysis result of the recognition model or saving resources or time necessary for generating the recognition model.

The training data preprocessor 912 may preprocess data acquired for training for situation determination. For example, the training data preprocessor 912 may process the acquired data into a preset format such that the model trainer 914 uses the acquired data for training for situation determination.

The training data selector 913 may select data necessary for training among data acquired by the training data acquirer 911 or data preprocessed by the training data preprocessor 912. The selected training data may be provided to the model trainer 914. The training data selector 913 may select the training data necessary for training among the acquired or preprocessed data according to a preset selection criterion. Also, the training data selector 913 may select the training data according to a selection criterion preset by the training of the model trainer 914.

The trainer 910 may further include the model evaluator 915 so as to improve an analysis result of the data recognition model.

When evaluation data is input to the recognition model and an analysis result output from the evaluation data does not satisfy a certain criterion, the model evaluator 915 may cause the model trainer 914 to be trained again. In this case, the evaluation data may be data predefined for evaluating the recognition model.

For example, when the number or ratio of evaluation data whose analysis result is inaccurate among analysis results of the trained recognition model for the evaluation data exceeds a preset threshold value, the model evaluator 915 may evaluate that the certain criterion is not satisfied.

Meanwhile, when there are a plurality of trained recognition models, the model evaluator 915 may evaluate whether each trained recognition model satisfies the certain criterion and determine a model satisfying the certain criterion as a final recognition model. In this case, when there are a plurality of models satisfying the certain criterion, the model evaluator 915 may determine, as the final recognition model, any one model or a certain number of models that are preset in the descending order of evaluation score.

Referring to FIG. 14B, the recognizer 920 according to some embodiments may include a recognition data acquirer 921 and a recognition result provider 924.

Also, the recognizer 920 may further include at least one of a recognition data preprocessor 922, a recognition data selector 923, and a model updater 925.

The recognition data acquirer 921 may acquire data necessary for determining a situation. The recognition result provider 924 may determine the situation by applying the data acquired by the recognition data acquirer 921 to the trained recognition model as an input value. The recognition result provider 924 may provide an analysis result according to an analysis purpose of the data. The recognition result provider 924 may acquire an analysis result by applying the data selected by the recognition data preprocessor 922 or the recognition data selector 923, which will be described below, to the recognition model as an input value. The analysis result can be determined by the recognition model.

For example, the recognition result provider 924 may acquire function information corresponding to command information of the user by applying command information according to a user action of executing a specific function in the recognition data acquirer 921 to a function estimation model that is a trained recognition model.

Alternatively, the recognition result provider 924 may acquire function information corresponding to command information of the user by applying command information of the user, related to a specific function in the recognition data acquirer 921, to a feedback estimation model that is a trained recognition model.

The recognizer 920 may further include the recognition data preprocessor 922 and the recognition data selector 923 so as to improve an analysis result of the recognition model or save resources or time for providing the analysis results.

The recognition data preprocessor 922 may preprocess the acquired data so that the acquired data is usable for situation determination. The recognition data preprocessor 922 may process the acquired data into a predefined format such that the recognition result provider 924 uses the acquired data for situation determination.

The recognition data selector 923 may select data necessary for situation determination among data acquired by the recognition data acquirer 921 or data preprocessed by the recognition data preprocessor 922. The selected data may be provided to the recognition result provider 924. The recognition data selector 923 may select all or part of the acquired or preprocessed data according to a preset selection criterion for situation determination. Also, the recognition data selector 923 may select data according to a selection criterion preset by training of the model trainer 914.

The model updater 925 may control the recognition model to be updated based on the evaluation of the analysis result provided by the recognition result provider 924. For example, the model updater 925 may provide the model trainer 914 with the analysis result provided by the recognition result provider 924, such that the model trainer 914 is requested to additionally train or update the recognition model.

Figure 15:
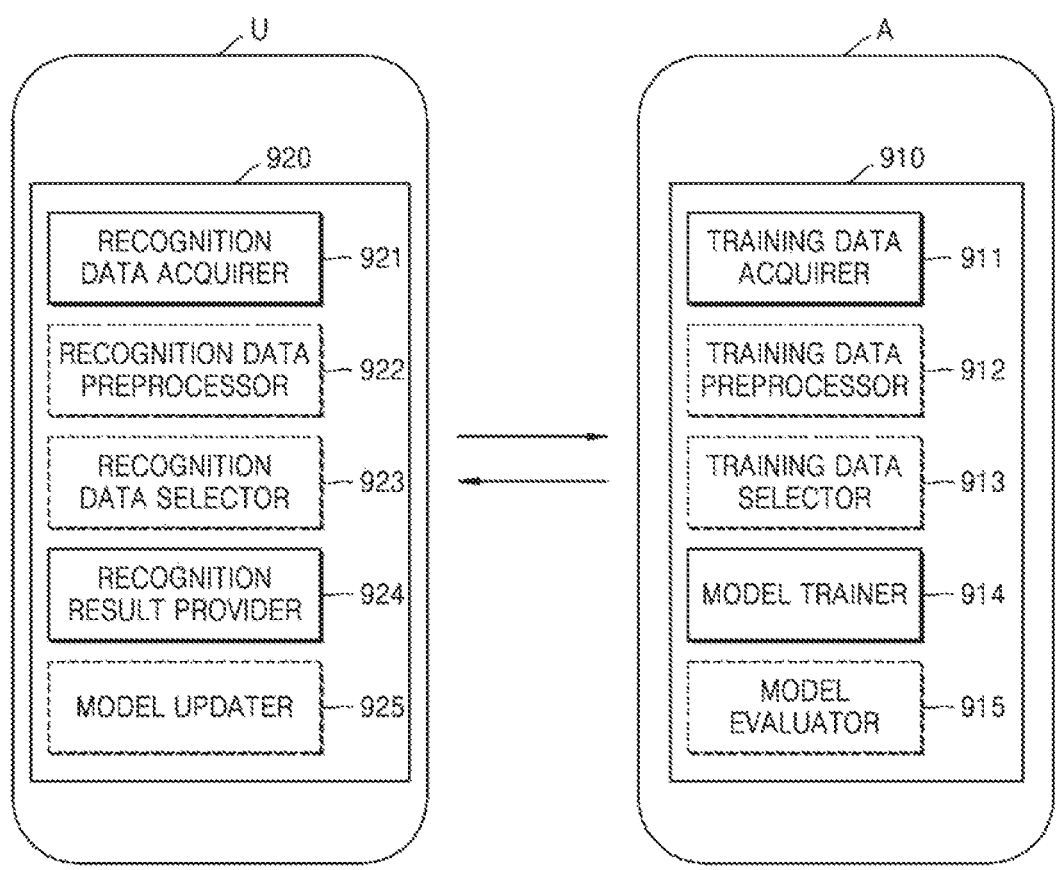

FIG. 15 is a diagram illustrating an example of training and recognizing data by interworking between a user terminal and an electronic device, according to an embodiment.

In FIG. 15, a user terminal U may be a user terminal that provides a function execution or preparation screen based on the function information, and the electronic device A may be at least one of the function estimation apparatus F and the feedback estimation apparatus R.

Referring to FIG. 15, the electronic device A may learn a criterion for situation determination, and the user terminal U may determine a situation based on a learning result of the electronic device A.

In this case, the model trainer 914 of the electronic device A may perform the function of the model trainer 914 illustrated in FIG. 14A. The model trainer 914 of the electronic device A may learn a criterion for estimating function information corresponding to command information of the user or estimating feedback information corresponding to response information of the user.

Also, the recognition result provider 924 of the user terminal U may determine a certain situation by applying the data acquired by the recognition data acquirer 921 or selected by the recognition data selector 923 to the recognition model generated by the electronic device A.

For example, the recognition result provider 924 of the user terminal U may transmit the command information of the user to the electronic device A and receive function information corresponding to the command information of the user as a result acquired when the electronic device A applies the command information of the user to the recognition model. Alternatively, the recognition result provider 924 of the user terminal U may transmit the response information of the user to the electronic device A and receive feedback information corresponding to the response information of the user as a result acquired when the electronic device A applies the response information of the user to the recognition model.

Alternatively, the user terminal U may receive, from the electronic device A, the recognition model generated by the electronic device A and determine a situation by using the received recognition model.

For example, the recognition result provider 924 of the user terminal U may acquire function information corresponding to the command information of the user as a result of applying the command information of the user to the recognition model stored in the user terminal U. Alternatively, the recognition result provider 924 of the user terminal U may acquire function information corresponding to the command information of the user as a result of applying the command information of the user to the recognition model stored in the user terminal U.

The term "module" as used herein includes a unit including hardware, software, or firmware and may be used interchangeably with the terms "logic," "logic blocks," "components," "circuits," and the like. The module may be an integrally formed part or a minimum unit for performing one or more functions or a part thereof. For example, the module may include an application-specific integrated circuit (ASIC).

Various embodiments of the present disclosure may be implemented as software that includes instructions stored in machine-readable storage media (or computer-readable storage media). The device is a device capable of calling the stored instructions from the storage media and operating according to the called instructions. The device may include the electronic devices (e.g., the electronic device A and the user terminal U) according to the embodiments of the present disclosure. When the commands are executed by the processor, the processor may perform the functions corresponding to the commands by using other elements directly or under the control of the processor. The commands may include code generated or executed by a compiler or an interpreter. The machine-readable storage media may be provided in the form of non-transitory storage media. The term "non-transitory" means that the storage media does not include a signal and is tangible, and does not limit that data is stored in the storage media semi-permanently or temporarily.

According to an embodiment, the methods according to various embodiments of the present disclosure may be provided in a state of being included in a computer program product. The computer program product may be traded between a seller and a buyer as a product. The computer program product may be distributed in the form of a machine-readable storage media (e.g., a compact disc read only memory (CD-ROM)) or may be distributed online through an application store (e.g., Play Store™). In the case of the online distribution, at least a part of the computer program product may be at least temporarily stored or temporarily created in a storage media such as a memory of a server of a manufacturer, a server of an application store, or a relay server.

Each element (e.g., a module or a program) according to various embodiments may include one or more entities, and a part of the above-described sub-elements may be omitted or other sub-elements may be further included in various embodiments. Alternatively or additionally, some elements (e.g., modules or programs) may be integrated into a single entity to perform the same or similar functions performed by each corresponding element prior to integration. The operations performed by the module, the program, or other elements according to various embodiments may be performed sequentially, in parallel, repeatedly, or heuristically, or at least some operations may be performed in a different order or may be omitted, or other operations may be added.

The invention claimed is:

1. A feedback information acquisition method comprising:
    acquiring input feedback information of a user and first response information of the user, which are related to a specific function;
    training a feedback estimation model by using the input feedback information and the first response information;
    acquiring second response information of the user related to the specific function; and
    acquiring feedback information related to the specific function by applying the second response information to the trained feedback estimation model.

2. The feedback information acquisition method of claim 1, further comprising transmitting the feedback information related to the specific function to a function estimation apparatus configured to acquire function information about a function to be executed by using command information of the user.

3. The feedback information acquisition method of claim 2, wherein the function estimation apparatus is configured to train a function estimation model by using the feedback information related to the specific function.

4. The feedback information acquisition method of claim 1, wherein the first response information and the second response information are information based on at least one of facial information of the user and voice information of the user, which are related to the specific function.

5. The feedback information acquisition method of claim 4, wherein the facial information comprises facial expression information of the user related to the specific function.

6. The feedback information acquisition method of claim 1, wherein the input feedback information, the first response information, and the second response information correspond to input feedback information of the user, first response information of the user, and second response information of the user, which are related to a specific function provided by an external user terminal communicatively connected, respectively.

7. The feedback information acquisition method of claim 1, wherein the input feedback information of the user comprises execution success information corresponding to selection information of a user who has selected an execution continuation user interface (UI) with respect to the specific function or execution failure information corresponding to selection information of a user who has selected an execution cancellation UI with respect to the specific function.

8. The feedback information acquisition method of claim 1, wherein the feedback information related to the specific function comprises execution success information or execution failure information in which a users feedback is estimated for the specific function.

9. The feedback information acquisition method of claim 1, wherein the first response information and the second response information are information acquired during execution of the specific function, acquired during preparation of the specific function, or acquired while the user inputs feedback.

10. The feedback information acquisition method of claim 1, wherein the trained feedback estimation model is a model configured to provide feedback information as estimation data, which is a result of estimating a user's feedback, by using response information as recognition data.

11. An electronic device comprising:
    a memory configured to store a feedback estimation model;
    a communicator configured to communicate with an external device; and
    a processor electrically connected to the memory and the communicator,
    wherein the processor is configured to:
    train the feedback estimation model stored in the memory by using input feedback information of a user and first response information of the user, which are related to a specific function, the input feedback information and the first response information being acquired through the communicator; and when second response information of the user, related to the specific function, is acquired through the communicator, acquire feedback information related to the specific function by applying the second response information to the trained feedback estimation model.

12. The electronic device of claim 11, wherein the processor is further configured to control the communicator to transmit the feedback information related to the specific function to a function estimation apparatus configured to acquire function information about a function to be executed by using command information of the user.

13. The electronic device of claim 12, wherein the function estimation apparatus is further configured to train a function estimation model by using the feedback information related to the specific function.

14. The electronic device of claim 11, wherein the first response information and the second response information are information based on at least one of facial information of the user and voice information of the user, which are related to the specific function.

15. A computer program product comprising a non-transitory recording medium having stored therein a program for performing: acquiring input feedback information of a user and first response information of the user, which are related to a specific function; training a feedback estimation model by using the input feedback information and the first response information; acquiring second response information of the user related to the specific function; and acquiring feedback information related to the specific function by applying the second response information to the trained feedback estimation model.

* * * * *